(12) United States Patent
Yuan et al.

(10) Patent No.: US 6,274,035 B1
(45) Date of Patent: Aug. 14, 2001

(54) BIOLOGICAL FILTRATION USING PARALLEL SHEETS

(76) Inventors: Sidney W. K. Yuan; Katherine K. Yuan; Jacquelyn K. Yuan; Chrystal S. Yuan, all of 12422 Sanford St., Los Angeles, CA (US) 90066

( * ) Notice: Subject to any disclaimer, the term of this patent is extended or adjusted under 35 U.S.C. 154(b) by 0 days.

(21) Appl. No.: 09/274,855

(22) Filed: Mar. 23, 1999

(51) Int. Cl.⁷ .................................................. C02F 3/00
(52) U.S. Cl. ................................... 210/150; 210/615
(58) Field of Search ........................... 210/615, 150, 210/151

(56) References Cited

U.S. PATENT DOCUMENTS

| | | | |
|---|---|---|---|
| 4,184,946 | * | 1/1980 | Kato ................................. 210/615 |
| 5,089,137 | * | 2/1992 | McKown ............................ 210/150 |
| 5,326,475 | * | 7/1994 | Kent .................................. 210/615 |
| 5,348,654 | * | 9/1994 | Fischer .............................. 210/151 |

* cited by examiner

Primary Examiner—Chester T. Barry

(57) ABSTRACT

This invention relates to compact, high efficiency filter medium for used in biological filters. Thin filter sheets provide large surface area for the colonization of bacteria. Stacking the filter sheets in layers or rolling the sheet upon itself produce uniform flow passages defined by the spacers on the filter sheets which prevent fluid from flowing through a few large passages and thus reducing the efficiency of the entire filter.

21 Claims, 6 Drawing Sheets

General Fluid Flow Direction

General Fluid Flow Direction

Figure 1:
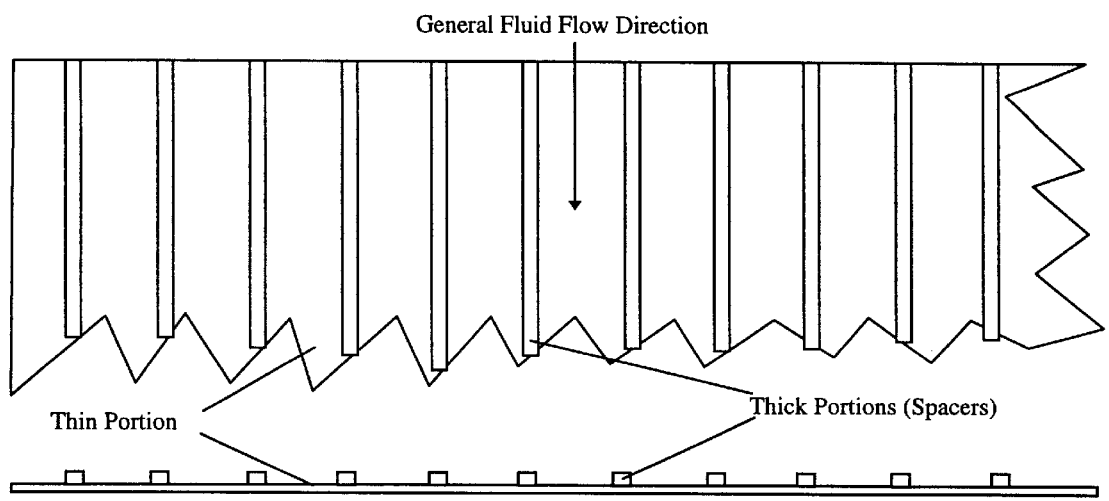
Figure 2:
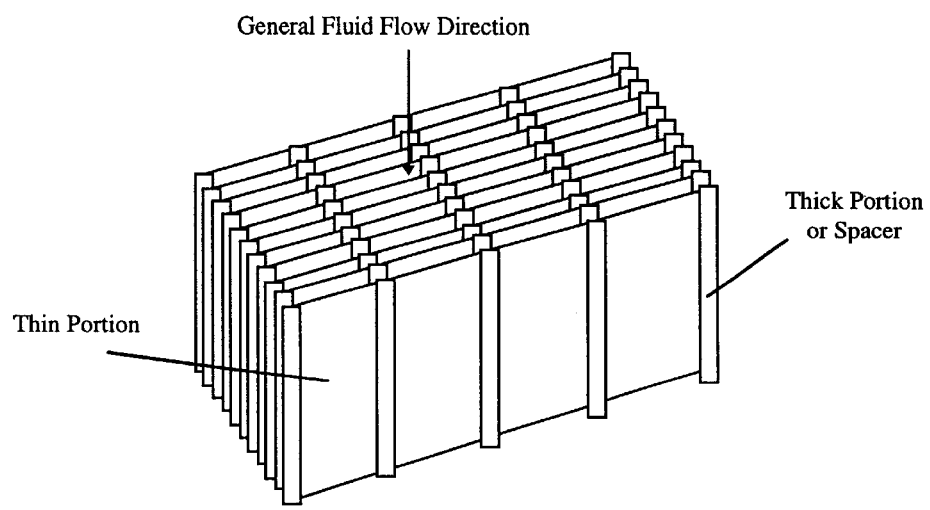
Figure 3:
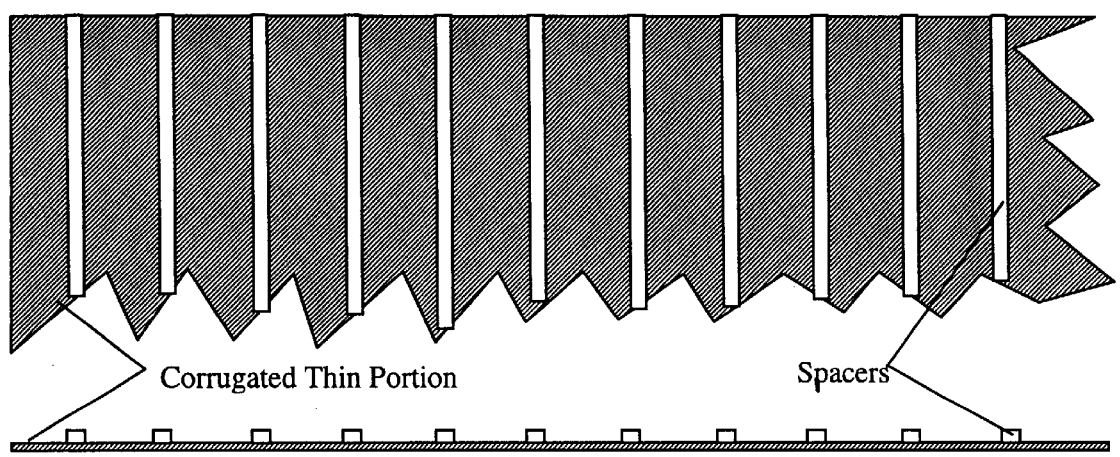
Figure 4:
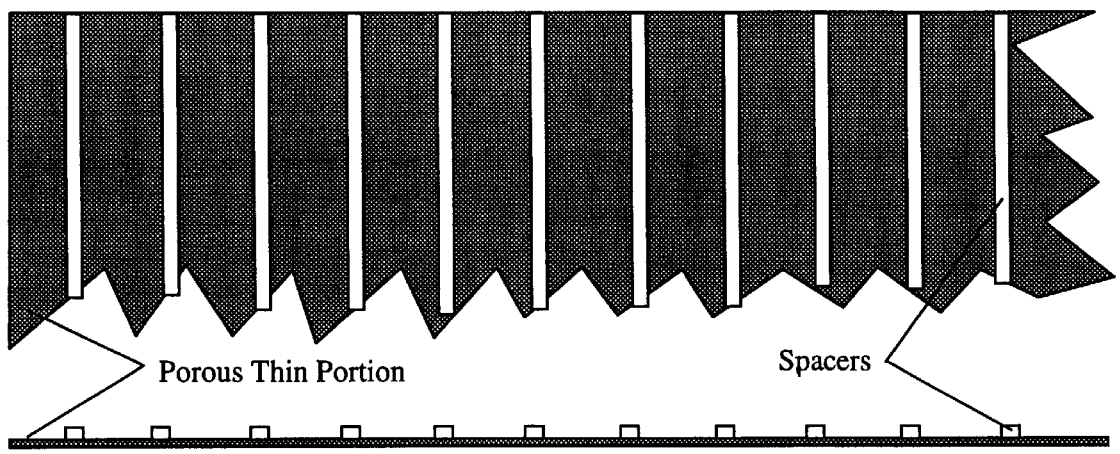
Figure 5:
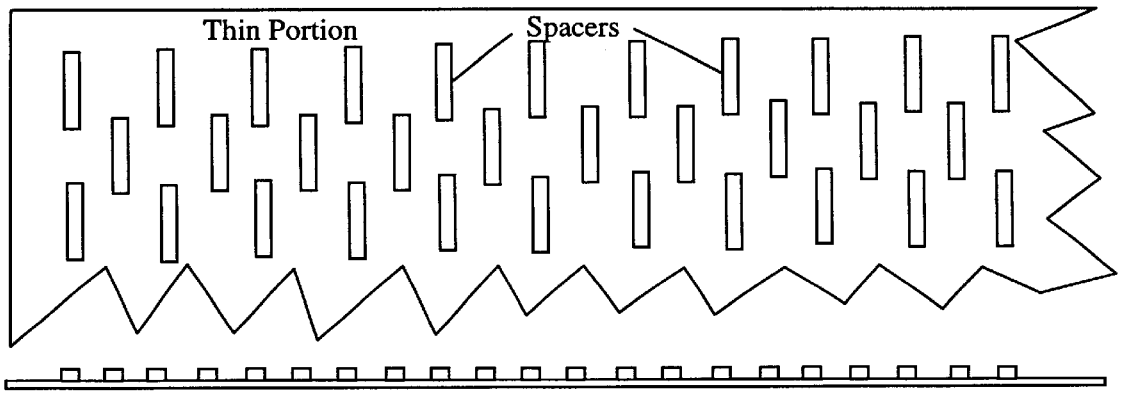
Figure 6:
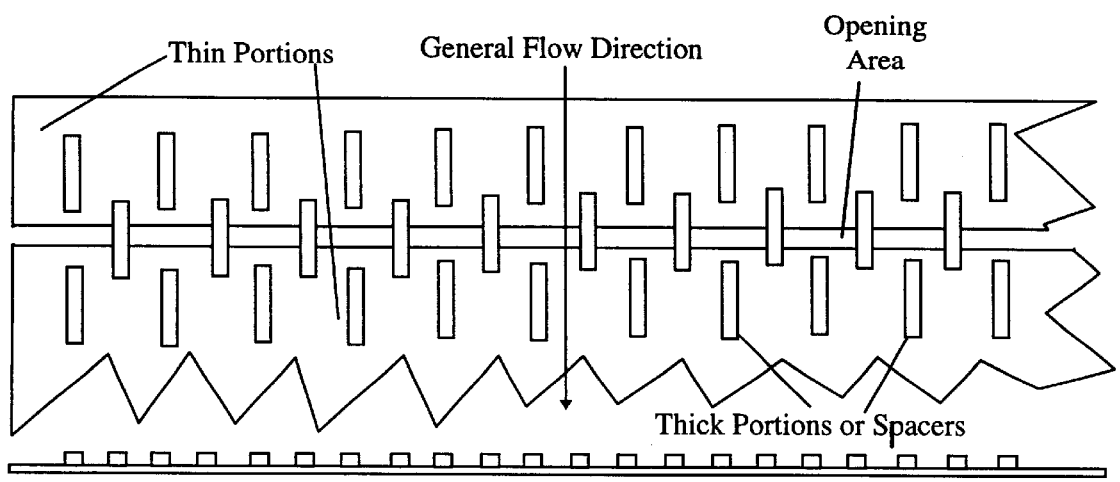
Figure 7:
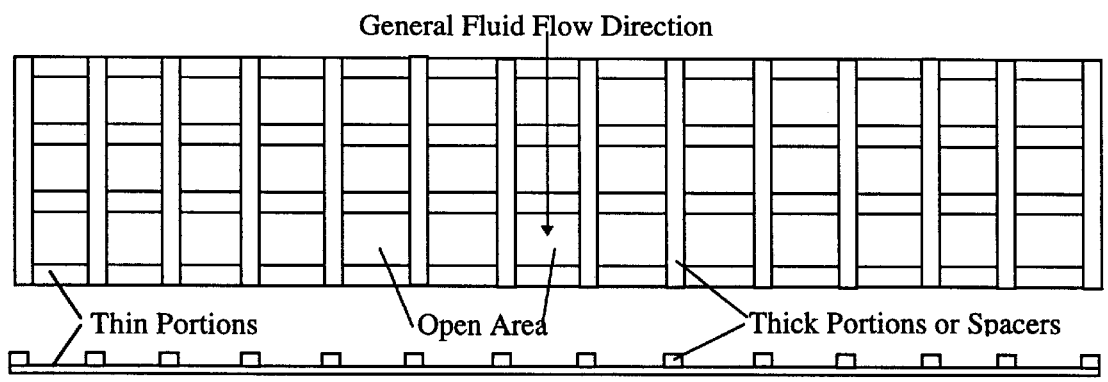
Figure 8:
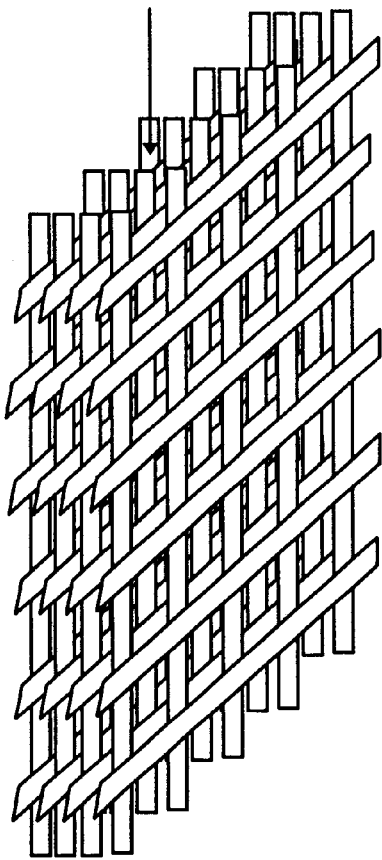
Figure 9:
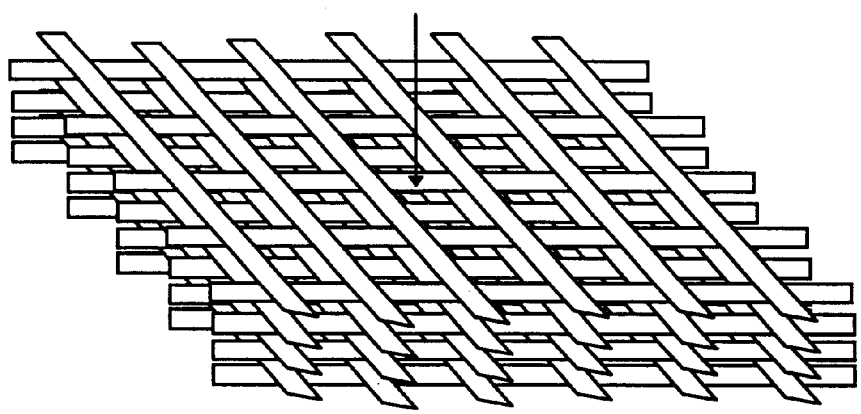

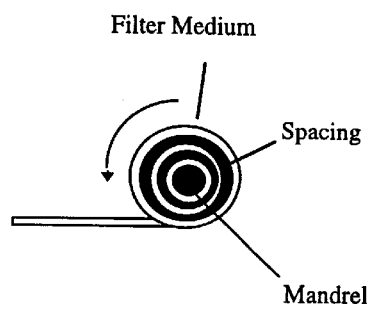
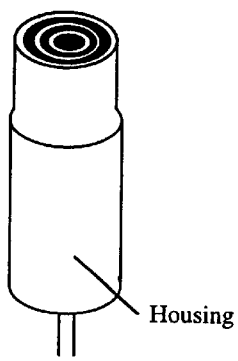
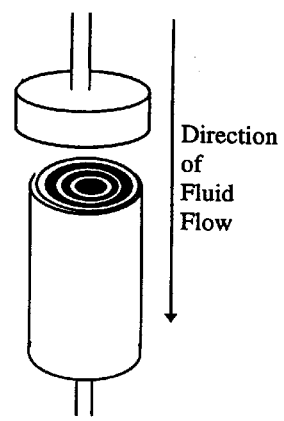
Fig. 10a      Fig. 10b      Fig. 10c
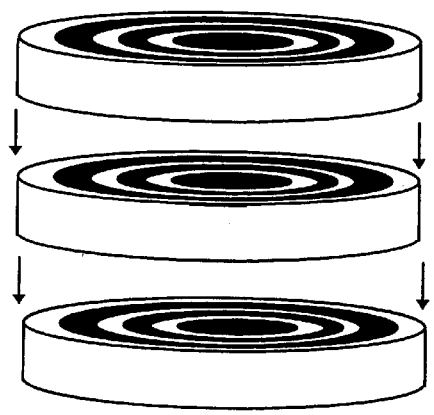
Fig. 11
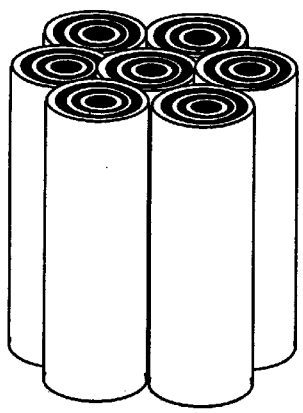
Fig. 12

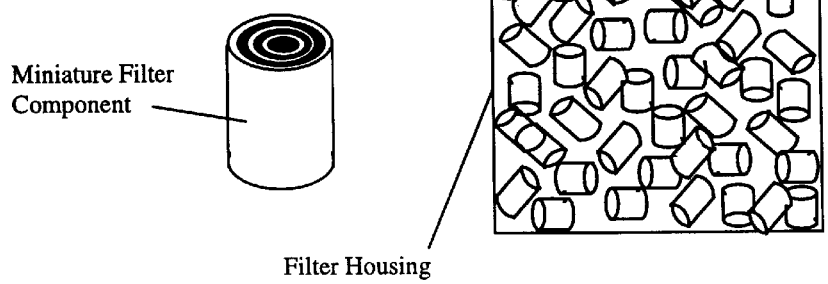
Fig. 13a
Fig. 13b
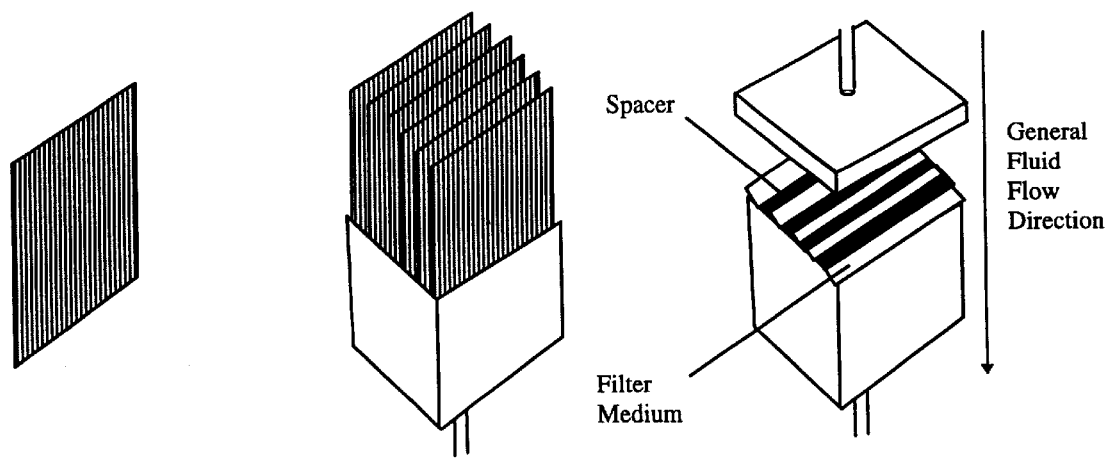
Fig. 14a  Fig. 14b  Fig. 14c

BIOLOGICAL FILTRATION USING PARALLEL SHEETS

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO A MICROFICHE APPENDIX

Not Applicable

BACKGROUND OF THE INVENTION

Biological filtration is routinely used in applications like sewage and waste water management and in the keeping of tropical and cold water fish by hobbyists, etc. Biological filtration relies on the activity of specific bacteria cultured in the filter to break down toxic waste products into less harmful substances. A good filter material should provide the largest surface area for bacteria to colonize but shall not block the fluid flow. Unfortunately, filters with large surface area (like porous media, foams or sponges) tend to clog up easily, thus reducing the effectiveness of the filter. Moreover, due to the distribution of the size of flow passages, fluid will tend to flow through only a few large passages, thus greatly reduces the effectiveness of the entire filter medium. The filter design discussed in this patent provides uniform size of flow passages thus the fluid flow through the entire filter instead of a few passages, giving the filter a large effective area for the bacteria to colonize. Flow through parallel plates also offers one of the best geometries for low flow resistance in fluid dynamic, thus reducing the chance of clogging. It can be used for both wet/dry and submerged biological filtration systems.

BRIEF SUMMARY OF THE INVENTION

The present parallel sheets filter provides large effective surface area for the colonization of bacteria, but has little or no chance of clogging up.

Some objects and advantages of this invention are to provide compact, efficient filters that can be economically customized and fabricated for use in biological filters for both trickle and submerged filtration systems.

This invention is a sheet filter with precise dimension of the spacers (thick portion) raising above the remaining of the sheet (thin portion). The distance between the spacers defines the width of the flow passage, and the thickness of the spacer defines the depth of the flow passages. It permits controlled variation in the passage size from one end of the filter to the other. It permits controlled variation in the ratio of surface area to total volume of the filter over a substantial range. This combination of desirable properties is unmatched by any prior filter design. Filter of this type may be created quickly and inexpensively by the method described below.

This invention is a practical way to achieve the advantages of flow between parallel plates. Parallel plates with very small clearances between them are ideal form of filter medium because parallel plates theoretically maximize surface area while minimizing losses resulting from fluid friction (i.e., pressure drop).

The filter sheet in this filter is wrapped or stacked upon itself with no folds, dimples or spaces to hold the successive layers apart. The width and depth of the flow passages can be accurately controlled when the sheets are stacked or rolled upon itself. Uniformity of flow passages reduces the tendency of the flow going through a few of the large passages, thus reducing the effective surface area of the filter.

The filter sheets can be sculpted by, machining, chemical etching, or photoetching, or molding out of a single piece of material. It can also be made from thin (thin portion) and thick (thick portion) filaments woven, press-fitted, fused, sintered, or bonded together. The actual manufacture of the filter can consist of nothing more than stacking or rolling the sheet upon a mandrel or upon itself. The stack or roll has great structural integrity and can then be inserted in the cavity of the filter.

By allowing flow passages of varying cross section from one end to the other, this invention permits filters to achieve the optimum combination of the filter surface area and flow resistance at each point along the flow passages, thereby enhancing filter effectiveness.

DETAILED DESCRIPTION OF THE INVENTION

The present filter design consists of a stack of parallel sheets separated by spacers. The sheets are made of material with non-uniform thickness; the thin portion providing large surface area for the cultivation of bacteria to break down toxic waste products, and the thick portions of the sheets acting as spacers separating the thin portions of the sheets (see Diagram 1). Diagram 2 depicts fluid passing through a stack of filter sheets. The sheets can be made by chemical etching, photolithography etching, molding, or machining. Pre-filtered fluid comes into contact with the filter sheets in a direction parallel to the sheets. (Pre-filtered fluid refers to fluid that has had particular matter removed through mechanical filtration devices, but which has not been biologically filtered). Since the active area for bacteria filtration on each filter sheet is a weak function of the thickness of the sheet, the total surface area of the filter is maximized by packing as many thin sheets into the filter as possible. While the thin portion of the sheets can be made as thin as possible, the thick portion (or spacer) has a limiting thickness, as the fluid flow can be clogged if the spacers are made too thin. A conventional trickle filter of 1 cubic foot in volume packed with biospheres has a typical total surface area of 130 square feet. With a sheet thickness of 0.15 inch (0.05 inch thin portion and 0.1 inch thick portion), a total of eighty 1 foot×1 foot filter sheets can be packed into the filter of the same volume. Since both sides of the filter sheet can be used for filtration, the total active surface area of the new design is 2×80 square feet or 160 square feet. For thinners sheets, the surface area can be substantially larger. Moreover, the surface area of this filter design can be further enlarged by having the surface of the thin portion and/or thick portion corrugated (Diagram 3) or have the filter sheet made of a porous medium (Diagram 4).

The thick portion (spacer) of the filter sheet can be continuous or discontinuous. Discontinuous spacers (Diagram 5) have the advantage of being able to equalize the pressure in the transverse direction to fluid flow (parallel to or across the sheets). This results in a more even flow distribution (preventing channeling of fluid in only a few of the channels).

The thin portion (active filter area) of the filter sheet can be continuous or discontinuous. Discontinuous thin portions (Diagram 6) have the advantage of being able to equalize the pressure in the transverse direction to fluid flow (but perpendicular to the sheets). This results in a more even flow distribution (preventing channeling of fluid between only a few sheets). A perforated thin portion filter sheet (Diagram 7) has the same effect as a discontinuous thin portion filter sheet. Diagram 8 depicts fluid passing through a stack of vertically packed perforated filter sheets. The use of perforated sheets for trickle biological filtration is particularly effective, as a liquid film is formed covering each opening of the filter sheet much like a soap film on a wire frame. Thus the openings of the perforated sheets hold on to the fluid and maximize the contact time among the bacteria, fluid, and air. Perforated filter sheets can be made by chemical etching, photolithography etching, molding, or machining out of a single piece of material, or manufactured by filaments of different thickness woven, press-fitted, fused, sintered, or bonded together.

Instead of packing the perforated filter sheets vertically, one can also pack them horizontally, allowing fluid to penetrate the filter sheets in a perpendicular direction (Diagram 9).

The filter medium is designed to retrofit existing filters of most any geometry. Most existing filter housings are either cylindrical or rectangular/square in shape.

For cylindrical filter housings, cut the filter medium to the same height as the filter housing. Roll the filter medium tightly around a mandrel to form a cylinder as shown in Diagram 10a. The thick portions serve as spacers which separate the filter medium enabling fluid to pass through the filter. When the diameter of the cylinder is as big as the inside diameter of the filter housing, cut off excessive filter medium. Insert the filter into the housing as shown in Diagram 10b. (The filter medium can be made to fit non-circular cylindrical filter housings by using mandrels that take the same shape as the housing, e.g., oval shapes.)

Diagrams 11 to 13 show other ways of packing the rolled filter sheets inside a filter. For the ease of construction and handling, one might want to pack the filter with more than one roll of filter. Diagram 11 and 12 depict two orderly ways of packing the rolled filter sheets, with filter rolls stacked on top of one another (Diagram 11) and with filter rolls bundled together (Diagram 12). Of course, small filter rolls can also be packed randomly in large filter housings as shown in Diagram 13.

For rectangular or square filter housings, cut the filter medium into rectangular or square sheets (Diagram 14a) with the same size as one of the sides of the housing, parallel to the water flow. Stack the filter medium up and insert them into the housing (Diagram 14b).

What we claim as our invention are:

1. A biological filter medium comprising:
   a stack of adjacent generally parallel sheets made of one-piece homogenous material of non-uniform thickness, with a plurality of solid thick portions of the sheets acting as spacers, separating the thin portions of the adjacent sheets allowing fluid to pass only through in-between adjacent sheets.

2. A biological filter medium according to claim 1, wherein said sheets are formed by chemical etching, photolithography etching, molding, or machining.

3. A biological filter medium according to claim 1, wherein said sheets are made from a natural material.

4. A biological filter medium according to claim 1, wherein said sheets are made from more than one piece of material woven, press-fitted, fused, sintered, or bonded together.

5. A biological filter medium according to claim 1, wherein said spacers extend continuously in the general fluid flow direction.

6. A biological filter medium according to claim 1, wherein said spacers extend discontinuously in the general fluid flow direction.

7. A biological filter medium according to claim 1, wherein said spacers angularly extend in both the fluid flow direction and transverse to the fluid flow direction.

8. A biological filter medium according to claim 1, wherein said spacers vary in width in the general fluid flow direction.

9. A biological filter medium according to claim 1, wherein said spacers vary in thickness in the general fluid flow direction.

10. A biological filter medium according to claim 1, wherein said spacers of each of said sheets are aligned with each respective of an adjacent one of the said sheets.

11. A biological filter medium according to claim 1, wherein said spacers of each sheet are misaligned with all of the spacers of an adjacent one of the said sheets.

12. A biological filter medium according to claim 1, wherein the spacers are on opposite sides of each sheet.

13. A biological filter medium according to claim 1, wherein said thin portions of the sheets are discontinuous in the general fluid flow direction.

14. A biological filter medium according to claim 1, wherein said thin portions of the sheets are discontinuous in the transverse direction of the general fluid flow direction.

15. A biological filter medium according to claim 1, wherein the surfaces of the said sheets are corrugated to further increase the surface area.

16. A biological filter medium according to claim 1, wherein the stack is formed as at least one roll of said sheet rolled about an axis generally parallel to the spacers.

17. A biological filter medium according to claim 1, wherein said thin portions of the sheets are perforated or made of porous material.

18. A biological filter comprising:
    a housing including an inlet for receiving prefiltered fluid and an outlet for filtered fluid; and
    a filter medium according to claim 17, wherein the fluid flow direction is perpendicular to the perforated sheets.

19. A biological filter comprising:
    a housing including an inlet for receiving prefiltered fluid and an outlet for filtered fluid; and
    a filter medium according to claim 1 filling the interior of the housing.

20. A biological filter comprising:
    a housing including an inlet for receiving prefiltered fluid and an outlet for filtered fluid, wherein
    said housing is packed with at least one roll of filter medium according to claim 16, filling the interior of a housing.

21. A biological filter medium according to claim 1, wherein said sheets are made from a synthetic material.

* * * * *